US006883082B2

(12) United States Patent
Shami et al.

(10) Patent No.: US 6,883,082 B2
(45) Date of Patent: Apr. 19, 2005

(54) CENTRAL DYNAMIC MEMORY MANAGER

(75) Inventors: Qasim R. Shami, Fremont, CA (US); Jagmohan Rajpal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 246 days.

(21) Appl. No.: 10/324,230

(22) Filed: Dec. 19, 2002

(65) Prior Publication Data

US 2004/0123038 A1 Jun. 24, 2004

(51) Int. Cl.⁷ ............................................. G06F 12/06
(52) U.S. Cl. ....................... 711/202; 711/220; 711/149; 711/152; 711/156; 711/159
(58) Field of Search ................................. 711/202, 220, 711/149, 152, 156, 159

(56) References Cited

U.S. PATENT DOCUMENTS 4,346,435 A * 8/1982 Wise ............................ 712/28

* cited by examiner

Primary Examiner—Reginald G. Bragdon
(74) Attorney, Agent, or Firm—Christopher P. Maiorana, P.C.

(57) ABSTRACT

A circuit generally comprising a memory and a core module is disclosed. The memory may be configured as (i) a first stack having a plurality of index pointers and (ii) a table having a plurality of entries. The core module may be configured to (i) pop a first index pointer of the index pointers from the first stack in response to receiving a first command generated by a first module external to the circuit, (ii) assign a first entry of the entries identified by the first index pointer to the first module, (iii) generate an address in response to converting the first index pointer and (iv) transfer the address to the first module.

20 Claims, 6 Drawing Sheets

CENTRAL DYNAMIC MEMORY MANAGER

FIELD OF THE INVENTION

The present invention relates to digital network switching generally and, more particularly, to a method and/or architecture for a central dynamic memory manager.

BACKGROUND OF THE INVENTION

Network switch circuits are commonly used to transfer information packets among two or more busses. The network switch accommodates busses operating at different rates, using different protocol and having different latency specifications. The information packets contain headers and trailers that are unique to a particular bus that should be added, altered or deleted when transferred to another bus.

Figure 1:
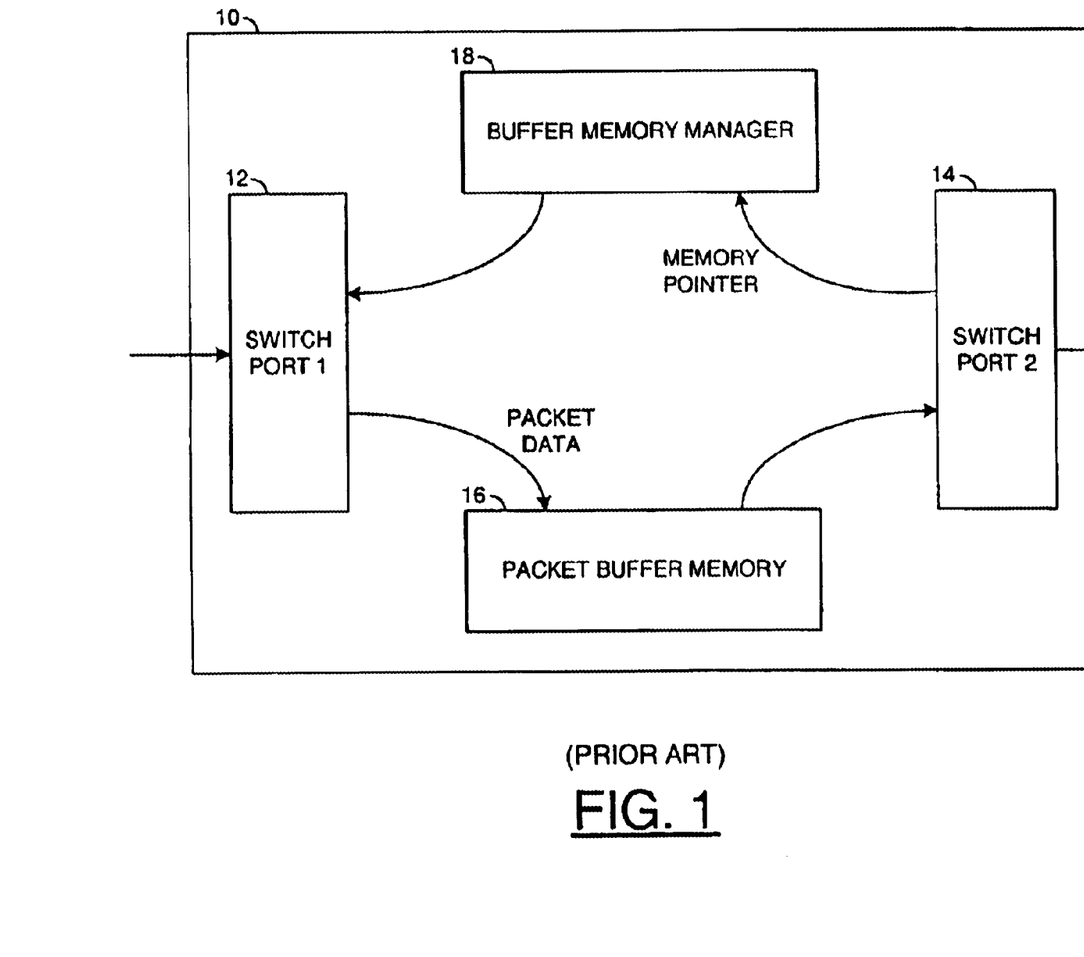
FIG. 1 is a block diagram of a simplified conventional two port store-and-forward Ethernet switch.

Referring to FIG. 1, a block diagram of a simplified conventional two port store-and-forward Ethernet switch 10 is shown. Each input to switch ports 12 and 14 writes Ethernet packets to locations in a packet buffer memory 16. Outputs from the switch ports 12 and 14 read packets from locations in the packet buffer memory 16. Locations of the packets in the packet buffer memory 16 are dynamically allocated by a buffer memory manager 18 when new packets arrive and then deallocated when the packets leaves a switch port 12 or 14. The buffer memory manager 18 can be a simple stack of memory pointers. The switch ports 12 and 14 read pointers from the stack upon receipt of an input packet and return pointers to the stack upon transmitting an output packet.

Figure 2:
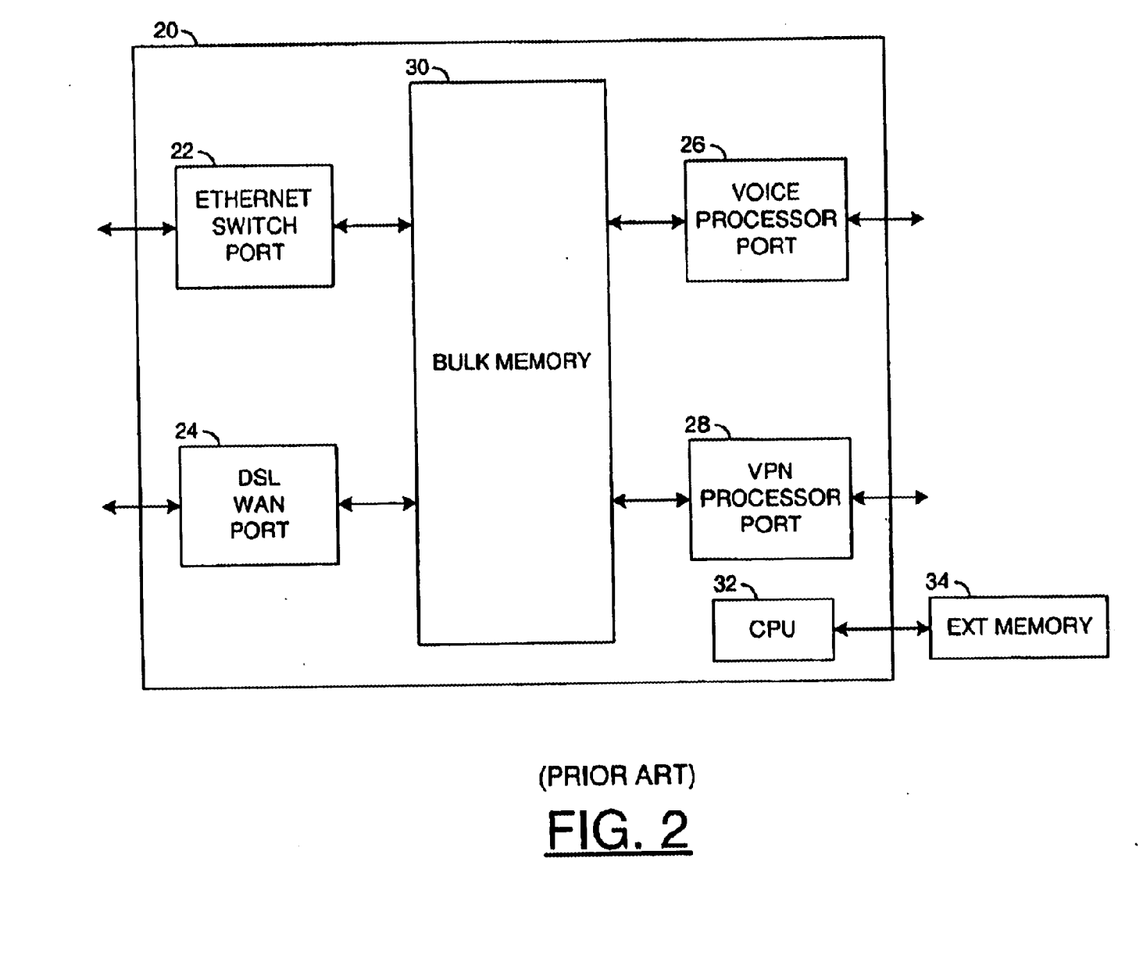
FIG. 2 is a block diagram of a conventional communication switch device.

Referring to FIG. 2, a block diagram of a conventional communication switch device 20 is shown. The device 20 includes several ports 22, 24, 26 and 28 sharing a central memory 30. The central or bulk memory 30 is typically a synchronous dynamic random access Memory (SDRAM). Each port 22, 24, 26 and 28 commonly has a different memory utilization. For example, an asynchronous transfer mode (ATM) modem connected to the device 20 often works with very small cells (i.e., 48 bytes) and with very large packets (i.e., 64 k bytes). ATM packets may be very heavily interleaved, one at a time, and thus the device 20 many store a number of partially received packets. However, a router/firewall (not shown) often adds or strips headers from the ATM packets. The router/firewall changes the size, and the starting address of the ATM packets. The Ethernet switch port 22 may "broadcast" a packet by sending packets to several ports simultaneously. Therefore, the device 20 stores multiple copies of the broadcast Ethernet packets. The voice processor port 26 commonly has a low latency specification. Thus, voice packets are moved through the bulk memory 30 rapidly. Furthermore, the virtual private network (VPN) processor port 28 and the digital subscriber line (DSL) Wide Area Network (WAN) port 24 uses the device resources differently than the Ethernet switch port 22 or the voice processor port 26.

Several methods exist for controlling the device 20 in simple communication systems. For example, linked-list data structures can be provided by a central processor unit (CPU) 32 and stored in an external memory 34. The ports 22, 24, 26 and 28 then read/write data to linked lists of buffers stored in the bulk memory 30. The CPU 32 adjusts the linked-list pointers and allocates/deallocates blocks of the bulk memory 30.

Control problems can arise for complex communication system for several reasons. For example, a large amount of processing power for the CPU 32 is utilized to maintain the linked lists and to allocate the bulk memory 30. Because the linked lists are usually in the external (i.e., high latency) memory 34, the CPU 32 often waits for memory accesses. In addition, maintaining the linked lists in the external memory 34 consumes a lot of memory bandwidth. For small packets, maintaining the linked list can use more memory bandwidth than the data. Furthermore, the CPU 32 utilizes processing resources to manage "broadcast" packets.

Another conventional control solution is to use an on-chip stack of pointers (not shown). The on-chip pointer stack avoids problems with external memory bandwidth and latency. Furthermore, the pointer stack solution does not burden the CPU 32 and keeps an internal copy-count for broadcast packets. However, the on-chip stack does not support linking small buffers to create larger buffers. Thus inefficient memory usage results for ports such as the DSL WAN port 24 where there are widely varying packet sizes. In addition, the on-chip stack is integrated into the device 20. No clear mechanism is present for other devices to share the stack. Also, the pointer stack does not provide a straight-forward mechanism for the device 20 to add/strip header information.

Memory leaks are also a common problem with conventional dynamic memory allocation systems. Memory leaks occur when a buffer is allocated but never deallocated. For complex systems, with several devices, memory leaks are very difficult to debug and correct.

SUMMARY OF THE INVENTION

The present invention concerns a circuit generally comprising a memory and a core module. The memory may be configured as (i) a first stack having a plurality of index pointers and (ii) a table having a plurality of entries. The core module may be configured to (i) pop a first index pointer of the index pointers from the first stack in response to receiving a first command generated by a first module external to the circuit, (ii) assign a first entry of the entries identified by the first index pointer to the first module, (iii) generate an address in response to converting the first index pointer and (iv) transfer the address to the first module.

The objects, features and advantages of the present invention include providing a method and/or architecture for a central dynamic memory manager that may (i) allocate/deallocate blocks of memory for multiple devices, (ii) act as a stack of pointers to blocks of memory, (iii) maintain a copy-count for each buffer; (iv) link buffers to create larger blocks of memory, (v) separate pointer addresses into a buffer address and an offset, (vi) allow headers to be added/stripped in an efficient manner, (vii) maintain owner-identification for each buffer to help identify the owner of the pointer, (viii) age buffers to help identify and fix memory leaks, (ix) reside on-chip, (x) perform minimal interruptions of a central processor unit, (xi) support multiple sizes of buffers, (xii) have programmable buffer sizes, (xiii) save CPU horsepower, (xiv) support hardware direct memory access engines and a buffer manager to handle all the data movement, (xv) support different media processing criteria, (xvi) have a highly modular design and may support multiple clients, (xvi) provide hooks to add/strip header/trailers, (xvii) have features for broadcasting Ethernet type applications, (xviii) allow efficient bulk memory utilization by chaining buffers, (ixx) have features to debug and fix memory leaks, (xx) provide making multiple copies of buffers, (xxi) accommodate a modular design and/or (xxii) provide easy extensions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally addresses issues of handling memory buffers in network processor applications. A highly scalable method and/or architecture is generally described to handle varying processing and environment specifications. A modular approach may provide support for different configurations, numbers of ports, buffer sizes and types of busses.

Figure 3:
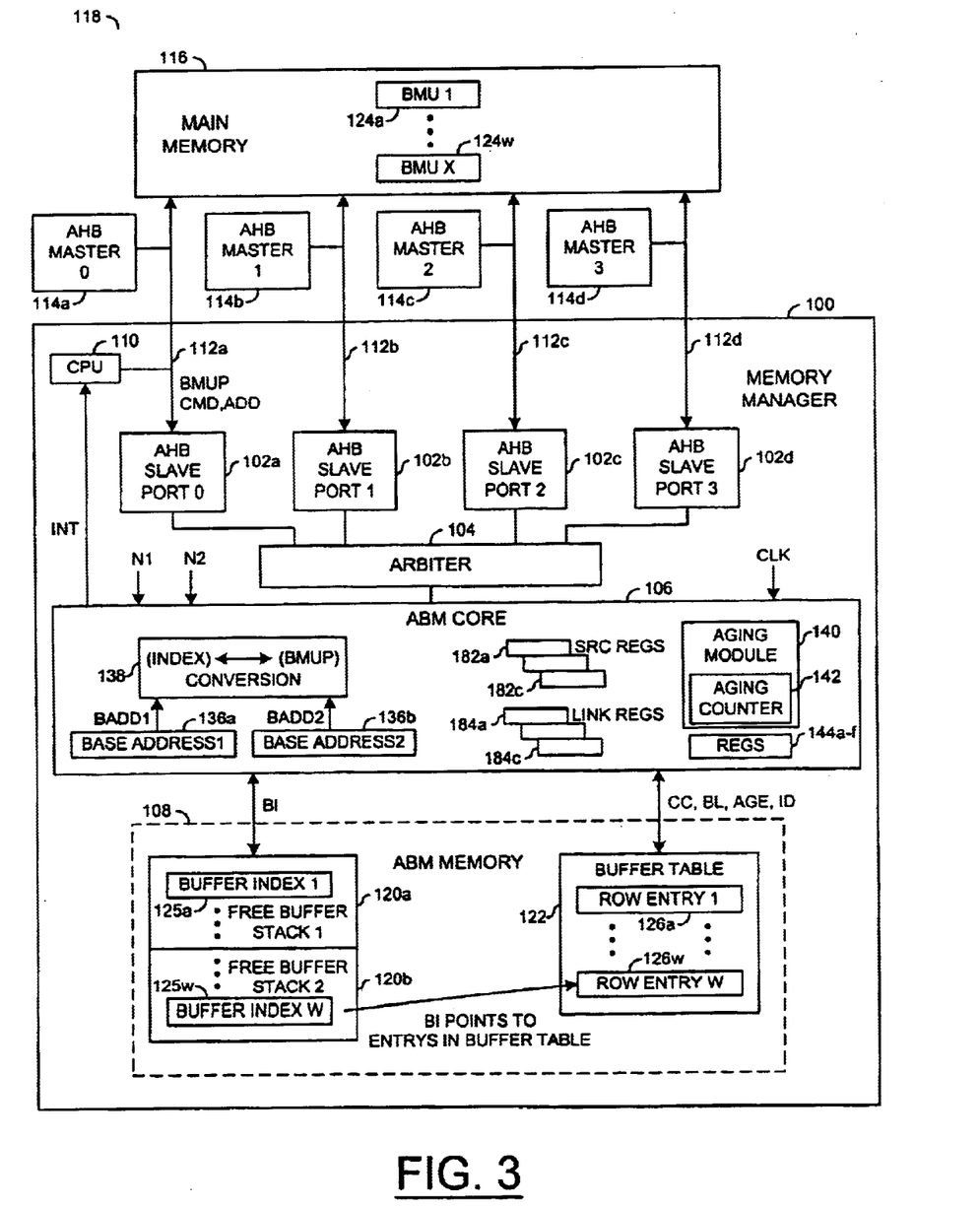
FIG. 3 is a block diagram of an example circuit in accordance with a preferred embodiment of the present invention.

Referring to FIG. 3, a block diagram of an example circuit 100 is shown in accordance with a preferred embodiment of the present invention. The circuit 100 generally comprises two or more circuits or modules 102a–d, a circuit or module 104, a circuit or module 106, a circuit or module 108 and a circuit or module 110. The circuit 100 may be implemented as a collection of circuits, a logic block, on-chip module or as a stand-alone device. The circuit 100 may be couplable to multiple busses 112a–d to communicate with external circuitry, such as circuits or modules 114a–d and a circuit or module 116. A combination of the circuit 100, the busses 112a–d the modules 114a–d and the circuit 116 may form a system or a system-on-a-chip 118.

The circuit 100 may be implemented as a central dynamic memory manager, or memory manager circuit for short. The circuit 116 may be implemented as a main memory having one or more memory modules, cores or blocks. The main memory module 116 may be a multi-port module coupled to each of the busses 112a–d. Each circuit 114a–d may be implemented as a bus master module, core or block. In one embodiment, the bus master modules 114a–d may be AHB master modules. Each AHB master module 114a–d may include a direct memory access (DMA) engine (not shown).

Each module 102a–d may be implemented as a bus block, core or port. Each bus port 102a–d may be configured to operate as a slave device. In one embodiment, the bus ports 102a–d and the busses 112a–d may be compliant with an Advanced High-performance Bus (AHB) defined in the "Advanced Microcontroller Bus Architecture (AMBA) Specification", revision 2.0, 1999, published by ARM Limited, Cambridge, England, and hereby incorporated by reference in its entirety. The memory manager circuit 100 may therefore be configured as a multiport AHB slave module with multiple AHB port modules 102a–d. In other embodiments, the bus ports 102a–d and busses 112a–d may be compliant with other bus standards, such as Ethernet, to meet the criteria of particular application.

The circuit 104 may be implemented as an arbiter module, core or block. The arbiter module 104 may also be compliant with the AMBA specification. The arbiter module 104 may provide an arbitration function that governs access to the circuit 106 by the AHB port modules 102a–d.

The circuit 106 may be implemented as a buffer manager module, core or block. The buffer manager module 106 may be referred to an AHB Buffer Manager (ABM) core module in applications where the busses 112a–d are implemented as AHB busses. The ABM core module 106 may be configured to operate with one or more different sized buffers in the circuit 116.

The circuit 108 may be implemented as a memory module, core or block. The memory module 108 may be referred to as an AHB memory module. In one embodiment, the AHB memory module 108 may be implemented as a synchronous dynamic random access memory (SDRAM). The memory module or modules 108 may be fabricated on the same chip or on a different chip as the ABM core module 106.

The AHB memory module 108 generally comprises one or more modules, core or blocks 120a–b and a module, core or block 122. Each module 120a–b may be configured as a free buffer stack. The module 122 may be configured as one or more buffer tables. In one embodiment, the buffer stack modules 120a–b and the buffer table module 122 may be implemented as logical separations in a single physical memory. In another embodiment, each module 120a–b and/or 122 may be implemented as a separate physical memory.

A buffer stack module 120 may be implemented for each size of a buffer 124a–w stored in the main memory module 116. In one embodiment, a single main memory module 116 may store all buffers 124a–w regardless of size. In another embodiment, a separate main memory modules 116 may be implemented for each of the different buffer sizes. The buffers 124a–w may also be referred to as buffer memory units (BMU).

The circuit 110 may be implemented as a central processor unit (CPU) module, core or block. The CPU module 110 is generally connected to the AHB bus 112a to communicate with the AHB port 0 module 102a. The CPU module 110 may be used to initialize and configure the ABM core module 106 and the buffer stack modules 120a–b through the AHB port 0 circuit 102a. In other embodiments, the CPU module 110 may be connectable to one or more other AHB busses 112b–d and/or have a direct interface to the ABM core module 106 to meet the design criteria of a particular application. The AHB master 0 module 114a and the CPU module 110 may be distinct modules (as shown) or logically part of a single module within the system 118, inside or outside the circuit 100.

When an AHB master module 114 requests use of a BMU 124, a buffer index pointer or signal (e.g., BI) may be popped from the appropriate free buffer stack module 120a–b. The free index pointers BI may be simple (e.g., 12-bit) pointers stored in buffer indices 125a–w. Each index pointer BI may have an associated BMU 124a–w and an associated row entry 126a–w stored in the buffer table module 122. A index pointer BI value of zero is generally reserved to indicate that the accessed buffer stack module 120a–b may be in an empty condition (e.g., all of the index pointers BI have been checked out).

The index pointer BI may be converted to buffer memory unit pointers or signals (e.g., BMUP) and then returned to the requesting AHB master module 114a–d via the appropriate AHB port module 102a–d and the AHB bus 112a–d. The memory pointers BMUP may be implemented as a higher range (e.g., 32-bits) address than the index pointers BI (e.g., 12-bits). The AHB master modules 114a–b may use the memory pointers BMUP to address the BMUs 124a–w. The ABM core module 106 may use the index pointers BI to address the row entries 126a–w. Each BMU 124a–w may be uniquely associated with a single row entry 126a–w. Each row entry 126a–w may provide multiple fields used for copy, ownership, aging and/or linking purposes.

Figure 4:
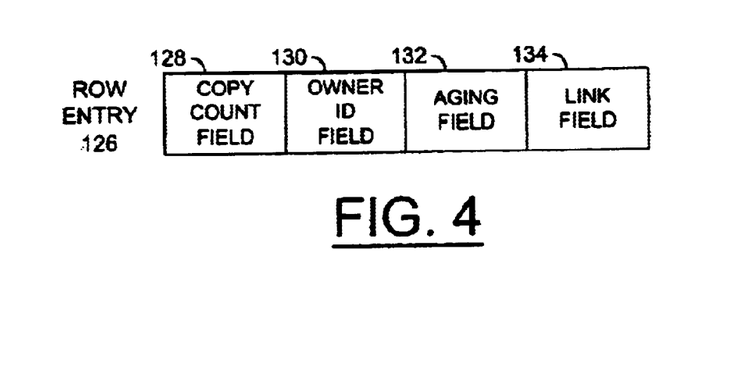
FIG. 4 is a block diagram of an example implementation of a row entry.

Referring to FIG. 4, a block diagram of an example implementation of a row entry 126 is shown. The row entry 126 generally comprises a field 128, a field 130, a field 132 and a field 134. The field 128 may contain a copy count value (e.g., CC). The copy count field 128 may be used to indicate how may copies of the associated BMU 124 may be returned before the BMU 124 is considered to be free memory space. A copy count value CC of zero generally indicates that the BMU 124 may be in an unused condition and thus free to be allocated to the AHB master modules 114a–d. In one embodiment, the copy count field 128 may be implemented as a 4-bit field allowing the BMU 124 to be copied fifteen times. Other sizes may be implemented for the copy count field 128 to meet the design criteria of a particular application utilizing other copy count values.

The field 130 may contain an owner identification value (e.g., ID). The owner identification value ID may identify which of the AHB port modules 102a–d requested or checked out the associated BMU 124. The owner identification value ID may be useful for debugging and may be helpful in locating the source of aging BMUs 124a–w. The owner identification field 130 is generally sized to allow each AHB port module 102a–d to be allocated a unique number or value. In one embodiment having four AHB port modules 102a–d, the owner identification field 130 may be implemented as a 2-bit field. Other sizes of the owner identification field 130 may be implemented to meet a design criteria of a particular application. In one embodiment, the owner identification field 130 may have a predetermined value indicating a nonowner condition (e.g., the associated BMU 124 may be free to be allocated) Therefore, the owner identification field 130 may be implemented as a 3-bit field to accommodate five possible values.

The field 132 may contain an aging value (e.g., AGE). In one embodiment, the aging field 132 may be implemented as a 1-bit field to indicate that the associated BMU 124 may be either new or old. Multi-bit aging fields 132 may also be implemented to provide a degree of how much time has pasted since a particular BMU 124 was allocated to an AHB master module 114.

The field 134 may store a buffer link pointer or signal (e.g., BL). The link pointer BL may be used to logically link one BMU 124 to another BMU 124. For example, a next BMU 124 (e.g., 124k) may be linked to an existing BMU 124 (e.g., 124j) by storing the index pointer BI associated with the next BMU 118K in the link field 134 of the row entry 126j associated with the existing BMU 124j. The combined BMUs 124j and 124k may provide additional storage space for adding a header to a packet stored in the BMU 124j. The combined BMUs 124j and 124k may also provide additional storage space for adding a trailer to a packet stored in the BMU 124k. A chain of linked BMUs 124 may contain two or more BMUs 124. Returning the index pointer BI of the first BMU 124 in a particular chain may break all of the links in the particular chain. In one embodiment, the link fields 134 may be implemented as 12 bits wide. Other sizes may be implemented to meet the criteria of a particular application. In one embodiment where linking the BMUs 124a–w may be prohibited, the link fields 134 may be eliminated.

Referring again to FIG. 3, when a AHB master module 114a–d has finished with a particular BMU 124 (e.g., BMU 124p), the associated index pointer BI may be pushed back onto the appropriate buffer stack module 120a–b as a free pointer. The counter value CC of the particular BMU 124p may be cleared (e.g., set to a zero value) to indicate that no copies of the particular BMU 124p may be outstanding. The owner identification value ID may optionally be set to a default value (e.g., seven) to indicate that the particular BMU 124p no longer has an owner. The aging value AGE of the particular BMU 120p may optionally be cleared (e.g., set to zero) to indicate that the particular BMU 124p is no longer old. The link pointer BL may be cleared (e.g., set to zero) to indicate that the particular BMU 124p may not be linked.

In addition to the allocation and deallocation of index pointers BI, a command interface may be defined for the AHB master modules 114a–d by which the BMUs 124a–w may be copied, buffer copies may be returned, and/or BMUs 124a–w may be linked to a new BMU 124a–w. The command interface may be implemented with command signals (e.g., CMD) generated by the AHB master modules 114a–d and the CPU module 110. The command signals CMD may be passed through the AHB port modules 102a–d and passed through the arbiter module 104, one at a time, to the ABM core module 106.

A first example command may request a free BMUP from a buffer stack module 120a or 120b (e.g., GET_BUFFER( )). The command GET_BUFFER may be implemented as an AHB read operation to one or more addresses (e.g., ADD) recognized by the AHB module 106. Based on a read address accompanying the GET_BUFFER command, the AHB module 106 may determine the BMU 124 size (e.g., which of the buffer stacks 120a or 120b) the command may be requesting. If no free index pointers BI are available in the appropriate buffer stack 120a–b, a predetermined value (e.g., zero) may be returned by the ABM core module 106 and the requesting AHB master modules 114a–d or CPU module 110 may try again. When one or more free index pointers BI are available, a free index pointer BI may be popped from the appropriate buffer stack module 120a–b. The index pointer BI may be converted in the ABM core module 106 to an address space of the main memory module 116. The converted address may then be returned in response to the GET_BUFFER command. The index pointer BI may then be used to address a row entry 126a–w from the buffer table module 108. The copy count value CC stored in the addressed row entry 126a–w may be automatically incremented from zero to one to indicate that a first copy of the associated BMU 124a–w has been allocated.

The AHB master modules 114a–d and the CPU module 110 may command a creation of multiple copies of a particular BMU 124 (e.g., BMU 124g) using a copy command (e.g., COPY_BUFFER(BMUP, M)). In one embodiment, the copy command COPY_BUFFER may generate up to fifteen copies of a BMU 124g. The memory pointer BMUP value may identify an address of the particular BMU 124g being copied. A current copy count value CC stored in the copy count field 128g associated with the particular BMU 124g may be increased by the value M (e.g., CC=CC+M). In one embodiment, the value M may range from one to fourteen. Other values M may be implemented to meet the criteria of a particular design application. The command COPY_BUFFER is generally useful if the particular BMU 124g may be intended for transfer to multiple destinations. The index pointer BI for the particular BMU 124g may be returned to the appropriate buffer stack module 120a–b when a last copy is returned (e.g., the copy count value CC reached zero).

The AHB master modules 114a–d and the CPU module 110 may generate a read link command (e.g., READ_LINK (BMUP)). The BMUP value transferred with the command READ_LINK may be converted to a index pointer BI by the ABM core module 106. The index pointer BI may point to a particular row entry 126a–w (e.g., row entry 126h) in the buffer table 122. The link pointer BL, if any, stored in the particular row entry 126h may be converted into the address space of the main memory module 116 by the ABM core module 106 and returned in response to the command READ_LINK. If no link exists in the link field 134, a predetermined value (e.g., zero) may be returned in response to the command READ_LINK.

The AHB master modules 114a–d and the CPU module 110 may create logical links among the BMUs 124a–w by issuing a link buffer command (e.g., LINK_BUFFER (BMUP_SRC, BMUP_DST)). The value BMUP_SRC generally identifies an address of a source BMU 124 (e.g., BMU 124s) and the value BMUP_DST generally identifies an address of a destination BMU 124 (e.g., BMU 124d). The command LINK_BUFFER may modify the link pointer BL in the row entry 126s assigned to the source BMU 124s to point to the row entry 126d assigned to the destination BMU 124d.

A return buffer command (e.g., RETURN_BUFFER (BMUP)) may be generated by the AHB master modules 114a–d and the CPU module 110 when finished with a particular BMU 124 (e.g., BMU 124t). The copy count value CC of the particular BMU 124t may be decremented in response to the command RETURN_BUFFER. When the copy count value CC reaches zero, the index pointer BI associated with the particular BMU 124t may be returned to the appropriate buffer stack module 120a–b. Optionally, the owner identification value ID, the aging value AGE and the link pointer BL for the particular BMU 124t may be set to respective default values.

The AHB master modules 114a–d and the CPU module 110 may read a number of index pointers BI available on the buffer stacks modules 120a–b using a command (e.g., AVAILABLE_BUFFERS( )). The number returned generally gives an approximate memory utilization of the main memory module 116. If little memory capacity is left, the AHB master modules 114a–d may reduce incoming traffic to avoid overflowing the main memory module 116.

The CPU module 110 may write and read entries directly to and from the ABM memory module 108 and ABM core module 106 using a tables command (e.g., READ/WRITE_TABLES(ADDRESS)). The parameter ADDRESS may identify a particular location within the ABM core module 106 and the ABM memory module 108 being accessed. The CPU module 110 generally performs the table reads and writes through the AHB port 0 module 102a. Other ports may be used for communication between the CPU module 110 and the ABM core module 106 to meet the criteria of a particular application.

The CPU module 110 may also initialize the buffer stack modules 120a–b and the buffer table module 122 using a push command (e.g., CPU_PUSH( )). The push command CPU_PUSH may be used to write complete lines of data (e.g., 32-bits per line). Each push command CPU_PUSH may also increment stack pointers to provide for sequential initialization of the ABM memory module 108.

Once a BMU 124 (e.g., BMU 124m) has been allocated, the AHB master modules 114a–d and the CPU module 110 may write information into the BMU 124m using conventional write commands. Information may be read from the BMU 124m using conventional read commands. Reading from the BMUs 124a–w generally does not cause the copy counter value CC to decrement. Writes and reads to and from the checked out BMUs 124a–w may take place independently of the ABM core module 106 and the ABM memory module 108.

The ABM core module 106 may be configured to convert (i) index pointers BI to memory pointers BMUP and (ii) memory pointers BMUP to index pointers BI. The ABM core module 106 and the buffer table module 122 generally use one or more internal buffer sizes that may be a power of 2 bytes. The internal buffer sizes may be determined by one or more multi-bit (e.g., 3-bit) parameters (e.g., N1-N2) The parameters N1 and N2 may be set at compile time for the memory manager circuit 100. Each internal buffer size is generally $2^N$ bytes (where N may be one of N1 or N2). In one embodiment, the parameters N1 and N2 may have a range of seven to fourteen. Other ranges for the parameters N1 and N2 may be provided to meet the design criteria of a particular application.

The range of four to seven generally allows for internal buffer sizes from 128 bytes (B) to 16 kB. The ABM core module 106 generally uses one or more fixed word-aligned base addresses (e.g. BADD1 and BADD2) to translate between the index pointers BI and the memory pointers BMUP. Each base addresses BADD1 and BAAD2 generally should end with N1 and N2 bits of zero, respectively. The base addresses BADD1 and BADD2 may be stored in registers 136a and 136b, respectively A conversion from a index pointer BI to a memory pointer BMUP may be performed by a conversion module or block 138. The conversion module 138 generally performs several sequential operations. First, the index pointer BI may be shifted left N bits (where N may be one of N1 or N2) to generate an intermediate address. A base address BADD (where BADD may be one or BADD1 or BADD2) may then be added to the intermediate address to generate the memory pointer BMUP.

A conversion from a memory pointer BMUP to index pointer BI may also be performed in the conversion module 138 in several sequential operations. First a base address BADD (where BADD may be one of BADD1 or BADD2) may be subtracted from the memory pointer BMUP to generate another intermediate address. The intermediate address may then be shifted N bits (where N may be one of N1 or N2) to the right to generate a index pointer BI.

By way of example, a memory manager circuit 100 may be configured to transfer packets of at least 1536 bytes. Therefore, a BMU 124 size of 2 kB (e.g., N=11) may be set at compile time. A base address of 0x0A00_0000 (hexadecimal) may be hardwired into the ABM core module 106 design or programmed during initialization. If one of the AHB master modules 114a–d (e.g., module 114c) requests a memory pointer BMUP and a free index pointer BI (e.g., having a value of 35 decimal) is popped from the buffer stack module 120a, the memory pointer BMUP may be shifted left by N bits (e.g., 11) to generate the intermediate address of 0x1_1800 (hexadecimal). The intermediate address may be added to the base address to generate the final BMUP of 0x0A00_0000+0x1_1800=0x0A01_1800 (hexadecimal).

A conversion from the memory pointer BMUP back to the index pointer BI may start by subtracting the base address from the memory pointer BMUP to generate the intermediate address, 0x0A01_1800−0x0A00_0000=0x1_1800 (hexadecimal). The intermediate address may then be shifted 11 bits to the right to generate the value 0x023 (hexadecimal) that equals the original index pointer BI value of 35 (decimal).

In some systems 118, headers may be added and/or stripped from packets. A process of adding or stripping from a packet may effectively move the memory pointer BMUP from a starting location by an offset value. Offset handling may be system-dependent and therefore handled primarily by the AHB master modules 114a–d and the CPU module 110.

Explicit offsets may be passed between AHB master modules 114a–d and the CPU module 110 with the memory pointer BMUP value. The offset may be passed explicitly as a unique parameter. For example, the AHB master module 114a may pass a data structure to the AHB master module 114b generally comprising (BMUP, length, offset, etc.) The offset may also be implied by a memory pointer BMUP value. For example, the parameter N may have a value of eight and the AHB master module 114a may pass a memory pointer BMUP value of 0xA123_0008 (hexadecimal) to the AHB master module 114b. Since the eight least significant bits of the memory pointer BMUP value should have all been zero, but actually contained a value of eight, the AHB master module 114b may extract the offset value from the memory pointer BMUP value by simply masking the N least significant bits of the memory pointer BMUP value.

The system 118 may be configured to use initial offsets on the BMUs 124a–w. If an initial offsets is used, a constant offset may be added to a first memory pointer BMUP in a packet by every receiving AHB master module 114a–d. The initial offset generally gives the CPU module 110 room to add a header by reducing the initial offset value.

If the system 118 does not use an initial offset, the CPU module 110 may still add a header to a packet. The CPU module 110 may get a new memory pointer BMUP from the ABM core module 106 and prepend the associated BMU 124 (e.g., BMU 124r) to the current BMU 124 (e.g., BMU 124s) holding the packet. The CPU module 110 may use the new BMU 124r to add the header. The ABM core module 106 may shift the returned memory pointer BMUP by N bits to the right to generate the index pointer BI. Any implicit offset added to the memory pointer BMUP should be removed by the shifting operation, as long as the offset may be less than the buffer size.

Memory leaks are possible with conventional memory allocation approaches. The ABM core module 106 may include a module or block 140 to help debug and fix memory leaks. The module 140 may be implemented in hardware and/or software as an aging module. The aging module 140 generally includes an aging counter 142.

The aging module 140 may automatically age all allocated row entries 126a–w in the buffer table module 122 and then monitor the row entries 126a–w periodically. A background process performed by the aging module 140 may periodically set the aging values AGE in the aging fields 128 for all row entries 126a–w entries allocated to BMUs 124a–w that have been checked out (e.g., copy count value CC>0). The aging value AGE may be automatically cleared whenever the copy count value CC is altered. If the aging process returns to find an aging value AGE still set, the aging module 140 may trigger an error flag to the CPU module 110. Since the ABM core module 106 may automatically record the owner identification value ID for the AHB port module 102a–d that checks out a first copy of each BMU 124a–w, the aging module 140 may copy the owner identification value ID of an expired BMU 124 (e.g., BMU 124e) to one of several registers 144a–f in the ABM core module 106. The CPU module 110 may then read the owner identification value ID of the expired BMU 124e from a register 144a–f to help identify the source of the memory leak.

The aging speed may be programmable. The aging counter 142 may operate based upon a system clock (e.g., CLK) In one embodiment where the system clock CLK operates at 100 MHz, the aging speed may be programmed to check the aging values AGE once every 10 milliseconds (ms) (e.g., 2^20 clock cycles), 168 ms (e.g., 2^24 clock cycles), or 2.7 seconds (e.g., 2^28 clock cycles). The aging counter 142 may also be disabled to suppress the aging process. Other aging periods may be implemented to meet the criteria of a particular application.

The aging process generally triggers an interrupt to the CPU module 110 if any BMU 124a–w exceeds the time limit established by the aging counter 142. The owner identification value ID of each old BMU 124a–w may be copied to a register 144. The aging module 140 may be configured to automatically fix memory leaks by forcing a return of the index pointers BI allocated to the expired BMUs 124a–w.

The ABM core module 106 may generate an interrupt to the CPU module 110 under one or more conditions. For example, as described above, an aging error interrupt may be triggered whenever an aging value AGE exceeds an age limit determined by the aging counter 142. The aging error interrupt may be implemented having a duration of a single system clock (e.g., 100 MHz) pulse.

A memory underflow interrupt may be triggered whenever any of the buffer stack modules 120a–b run out of index pointers BI and return an invalid index to the AHB master modules 114a–d or the CPU module 110. The memory underflow interrupt may be implemented having a duration of a single system clock pulse.

A low memory interrupt may be triggered whenever any of the buffer stack modules 120a–b contains less than X indices. A value of X may be programmable. In one embodiment, the value of X may range from 0 to 255. Other ranges may be implemented to meet a criteria of a particular application. A separate value may be programmed for each of the buffer stack modules 120a–b. The low memory interrupt may be asserted at a predetermined voltage level while a buffer stack module 120a–b is low.

An illegal access interrupt may be triggered by one or more events. For example, a copy count value CC of greater than a maximum allowed value (e.g., fifteen) may trigger the illegal access interrupt. Any BMU 124a–w returned with an associated copy count value CC not equal to zero may also trigger the illegal access interrupt. Furthermore, an allocation of a index pointer BI when no free index pointers BI are available may trigger the illegal access interrupt. In each of the above cases, the owner identification value ID for the access may be copied to a register 144a–f. The illegal access interrupt may be implemented having a duration equal to a single cycle of the system clock CLK.

The memory manager circuit 100 design may be modular and have a rich set of features that may be used in wide range of Network Processor designs. If the memory manager circuit 100 is implemented on-chip, the circuit 100 may easily support a wide range of processing criteria for applications such as an Asymmetrical Digital Subscriber Line (ASDL) modem.

Figure 5:
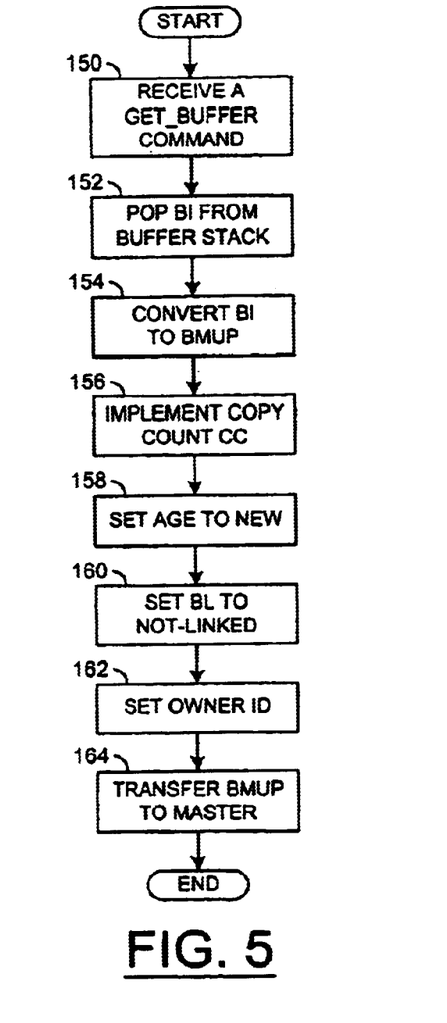
FIG. 5 is a flow diagram of a process of allocating a buffer index pointer.

Referring to FIG. 5, a flow diagram of a process of allocating a index pointer BI is shown. The process may begin with a reception of a GET_BUFFER( ) command from an AHB master 114 (e.g., block 150). The ABM core module 106 may pop a index pointer BI from the appropriate buffer stack 120a–b (e.g., block 152). The conversion module 138 may generate a memory pointer BMUP address from the index pointer BI (e.g., block 154). The ABM core module 106 may then increment the copy count value CC (e.g., block 156), set the aging value AGE to new (e.g., block 158), set the buffer link value BL to not-linked (e.g., block 160) and set the owner identification value ID to identify the requesting AHB port module 102a–d (e.g., block 162). The execution of the blocks 156–162 may be performed in any order and/or substantially simultaneously. The ABM core module 106 may transfer the BMUP back to the AHB master 114 (e.g., block 164).

Figure 6:
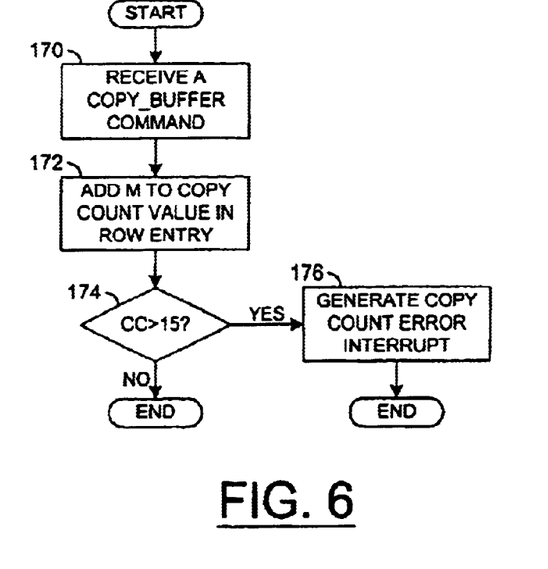
FIG. 6 is a flow diagram of a process or copying a buffer memory unit.

Referring to FIG. 6, a flow diagram of a process for copying a BMU 124 is shown. The process may begin upon receipt of a COPY_BUFFER (BMUP, M) command (e.g., block 170). The value M conveyed by the command may be added to the copy count value CC stored in the row entry 126a–w identified by the index pointer BI converted from the memory pointer BMUP (e.g., block 172). If the resulting copy count value CC is less than or equal to a predetermined maximum value, for example 15 (e.g., the NO branch of decision block 174), processing for the command may end. If the resulting copy count value CC is greater than the predetermined maximum value (e.g., the YES branch of decision block 174), the ABM core module 106 may generate a copy count error interrupt to the CPU module 110 (e.g., block 176).

Figure 7:
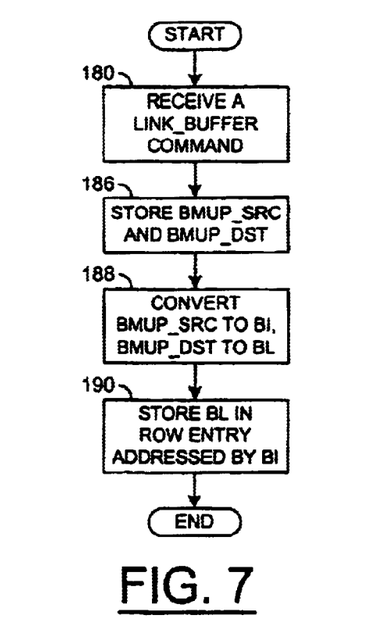
FIG. 7 is a flow diagram of a process for linking buffer memory units.

Referring to FIG. 7, a flow diagram of a process for linking BMUs 124a–w is shown. Upon receipt of a LINK_BUFFER command from an AHB master module 114 (e.g., block 180), the addresses BMUP_SRC and BMUP_DST may be stored in a register 182a–c and a register 184a–c in the ABM core module 106 (see FIG. 3), respectively (e.g., block 186). The converter module 138 may then convert the address BMUP_SRC to an index pointer BI and the address BMUP_DST may be converted to a link pointer BL (e.g., block 188). The link pointer BL may be stored in a row entry 126 pointed to by the index pointer BI (e.g., block 190). Therefore, the row entry 126a–w associated with the source BMU 124a–w may store a link pointer BL associated with the destination BMU 124a–w.

Figure 8:
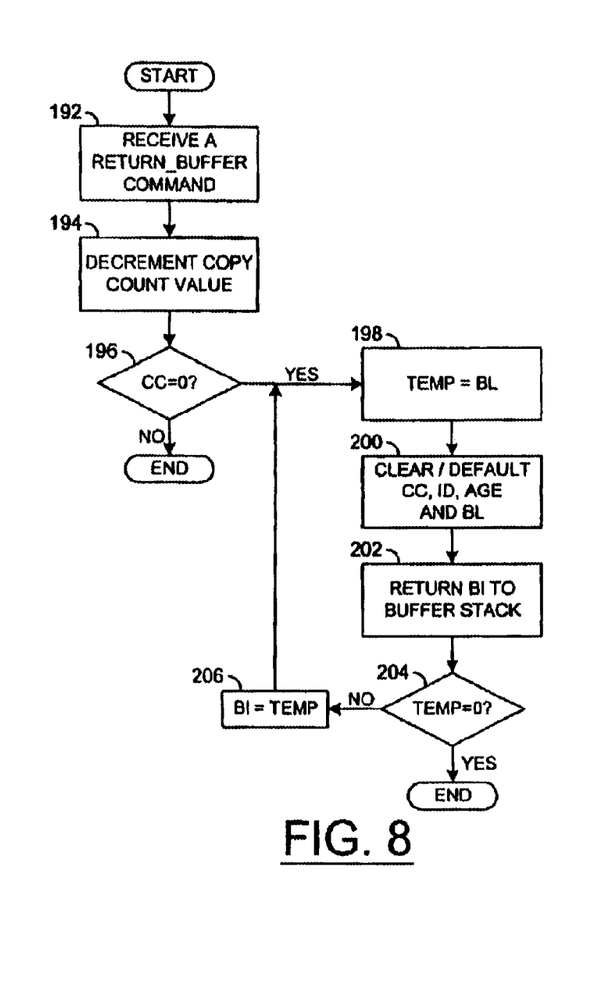
FIG. 8 is a flow diagram of a process for returning a buffer index pointer.

Referring to FIG. 8, a flow diagram of a process for returning an index pointer BI is shown. When an AHB master module 114 has completed using a BMU 124, the AHB master module 114 may transmit the RETURN_BUFFER (BMUP) command to the ABM core module 106 (e.g., block 192). The ABM core module 106 may decrement the copy count value CC associated with the BMU 124 identified by the RETURN_BUFFER command (e.g., block 194). If the decremented copy count value CC is greater than zero (e.g., the NO branch of decision block 196), the BMU 124 may still have copies to be read and thus may remain active. If the decremented copy count value CC is equal to zero (e.g., the YES branch of decision block 196), the ABM core module 106 may save (e.g., block 198) the link pointer BL associated with the BMU 124 as a temporary value (e.g., TEMP). The copy count value CC, the owner identification value ID, the aging value AGE and the link pointer BL may then be cleared and/or set to the appropriate default values (e.g., block 200). The index pointer BI assigned to the BMU 124 may then be returned to the appropriate buffer stack 120a–b (e.g., block 202). The temporary value TEMP may be checked to see if a chain exists (e.g., decision block 204). If the temporary value TEMP has a not-linked (e.g., zero) value (e.g., the YES branch of decision block 204), then there may be no chain to process. If the temporary value TEMP has a linked value (e.g., the NO branch of decision block 204), the temporary value TEMP may be used as a new index buffer BI pointing to the second row entry 126a–w in the chain (e.g., block 206). The process may loop back to blocks 198 through 202 to return the index pointer BI for the second BMU 124,in the chain. The loop around blocks 198 through 206 may continue until the index pointers BI for associated with all of the BMUs 124 in the chain have been returned to the buffer stack 120a–b.

Figure 9:
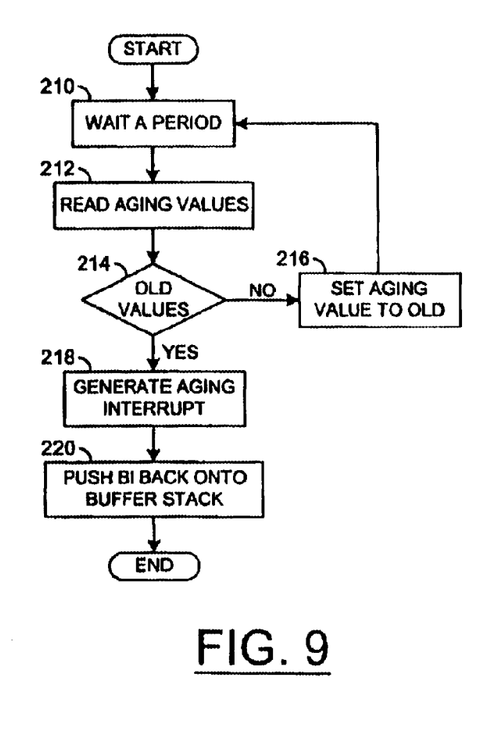
FIG. 9 is a flow diagram of a process for an aging process.

Referring to FIG. 9, a flow diagram of a process for an aging process is shown. The aging module 140 may wait a period as determined by the aging counter module 138 (e.g., block 210). The aging module 140 may check the aging value AGE in the row entry 126a–w associated with each allocated BMU 124a–w (e.g., block 212). If no aging values AGE have been found in the old state (e.g., the NO branch of decision block 214), the aging module 140 may set the just checked aging values AGE from the new state to the old state (e.g., block 216). The aging module 140 may then wait another period (e.g., block 210) before rechecking the aging values AGE again. If the aging module 140 finds one or more aging values AGE in the old state (e.g., the YES branch of decision block 214), the aging ABM core module 106 may generate an aging interrupt to the CPU module 110 (e.g., block 218). The index pointers BI of the expired BMUs 124 may then be pushed back onto the appropriate buffer stack 120a–b (e.g., block 220). Returning the index pointers BI to the buffer stack 120a–b may be performed by the ABM core module 106 in hardware or by the CPU module 110 in software.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope-of the invention.

What is claimed is:

1. A circuit comprising:
    a memory configured as (i) a first stack having a plurality of index pointers and (ii) a table having a plurality of entries; and
    a core module configured to (i) pop a first index pointer of said index pointers from said first stack in response to receiving a first command generated by a first module external to said circuit, (ii) assign a first entry of said entries identified by said first index pointer to said first module, (iii) generate an address in response to converting said first index pointer and (iv) transfer said address to said first module.

2. The circuit according to claim 1, further comprising a plurality of port modules couplable to a plurality of busses.

3. The circuit according to claim 1, wherein said core module comprises:
    a conversion module configured to convert (i) said first index pointer into said address and (ii) said address into said first index pointer.

4. The circuit according to claim 1, wherein each of said entries comprises:
an identification field configured to store an owner value identifying an ownership among a plurality of modules including said first module.

5. The circuit according to claim 1, wherein each of said entries comprises:
a link field configured to store a link pointer identifying one of (i) a not-linked condition and (ii) a link to another of said entries.

6. The circuit according to claim 1, wherein each of said entries comprises:
an aging field configured to store an age.

7. The circuit according to claim 6, wherein said core module comprises:
an aging module configured to trigger an interrupt in response to at least one of said ages being greater than a predetermined period.

8. The circuit according to claim 7, wherein said aging module comprises:
a counter configured to signal each passage of said predetermined period.

9. The circuit according to claim 1, wherein said memory is further configured as:
a second stack having a plurality of second index pointers.

10. The circuit according to claim 9, further comprising:
a plurality of port modules couplable to a plurality of busses; and
an arbiter configured to arbitrate among said port modules for access to said core module.

11. A method of operating a circuit, comprising the steps of:
(A) popping a first index pointer of a plurality of index pointers from a stack in response to receiving a first command generated by a first module external to said circuit;
(B) assigning a first entry of a plurality of entries identified by said first index pointer to said first module;
(C) generating an address in response to converting said first index pointer; and
(D) transferring said address to said first module.

12. The method according to claim 11, further comprising the step of:
incrementing a copy count for said first buffer in response to said first command.

13. The method according to claim 12, further comprising the step of:
adding a value to said copy count in response to receiving a second command conveying said value.

14. The method according to claim 11, further comprising the step of:
pushing said index pointer onto said stack in response to receiving a second command generated by said first module.

15. The method according to claim 14, further comprising the step of:
decrementing a copy count of said first buffer in response to said second command.

16. The method according to claim 15, further comprising the step of:
decrementing said copy count in response to receiving a third command generated by a second module external to said circuit.

17. The method according to claim 11, further comprising the step of:
setting an aging value of said first entry within a predetermined period from assigning said first entry to said first module.

18. The method according to claim 17, further comprising the step of:
pushing said index pointer onto said stack in response to said aging value being set for said predetermined period.

19. The method according to claim 11, further comprising the step of:
linking said first entry to a second entry of said entries in response to receiving a second command.

20. A circuit comprising:
means for popping a first index pointer of a plurality of index pointers from a stack in response to receiving a first command generated by first a module external to said circuit;
means for assigning a first entry of a plurality of entries identified by said first index pointer to said first module;
means for generating an address in response to converting said first index pointer; and
means for transferring said address to said first module.

* * * * *